US009275038B2

(12) United States Patent
Bierner et al.

(10) Patent No.: US 9,275,038 B2
(45) Date of Patent: Mar. 1, 2016

(54) METHOD AND APPARATUS FOR IDENTIFYING CUSTOMER SERVICE AND DUPLICATE QUESTIONS IN AN ONLINE CONSULTATION SYSTEM

(75) Inventors: Gann Bierner, Oakland, CA (US); Edwin Cooper, Oakland, CA (US)

(73) Assignee: Pearl.com LLC, San Francisco, CA (US)

( * ) Notice: Subject to any disclaimer, the term of this patent is extended or adjusted under 35 U.S.C. 154(b) by 667 days.

(21) Appl. No.: 13/464,287

(22) Filed: May 4, 2012

(65) Prior Publication Data

US 2013/0297545 A1    Nov. 7, 2013

(51) Int. Cl.
*G06F 17/27* (2006.01)
*G06Q 50/00* (2012.01)

(52) U.S. Cl.
CPC ............ *G06F 17/2775* (2013.01); *G06Q 50/00* (2013.01)

(58) Field of Classification Search
None
See application file for complete search history.

(56) References Cited

U.S. PATENT DOCUMENTS

| | | | |
|---|---|---|---|
| 5,384,703 A | 1/1995 | Withgott et al. |
| 5,566,302 A | 10/1996 | Khalidi et al. |
| 5,642,520 A | 6/1997 | Takeshita et al. |
| 5,918,240 A | 6/1999 | Kupiec et al. |
| 5,937,422 A | 8/1999 | Nelson et al. |
| 5,960,383 A | 9/1999 | Fleischer |
| 6,018,543 A | 1/2000 | Blois et al. |
| 6,029,195 A | 2/2000 | Herz |
| 6,144,672 A | 11/2000 | Brauner |
| 6,172,675 B1 | 1/2001 | Ahmad et al. |
| 6,173,279 B1 | 1/2001 | Levin et al. |
| 6,212,494 B1 | 4/2001 | Boguraev |
| 6,223,165 B1 | 4/2001 | Lauffer |
| 6,289,304 B1 | 9/2001 | Grefenstette |
| 6,629,097 B1 | 9/2003 | Keith |
| 6,638,317 B2 | 10/2003 | Nakao |
| 6,754,654 B1 | 6/2004 | Kim et al. |
| 6,823,325 B1 | 11/2004 | Davies et al. |
| 6,871,199 B1 | 3/2005 | Binnig et al. |
| 6,963,830 B1 | 11/2005 | Nakao |

(Continued)

FOREIGN PATENT DOCUMENTS

| | | | |
|---|---|---|---|
| CN | 101320374 A | * | 12/2008 |
| JP | 2004086583 A | | 3/2004 |
| WO | 2008077054 A1 | | 6/2008 |
| WO | 2011019852 A1 | | 2/2011 |

OTHER PUBLICATIONS

Gharehchopogh et al., "Machine Learing based Question Classification Methods in Question Answering Systems", Oct. 2013, International Journal of Innovation and Applied Studies, vol. 4 No. 2, pp. 264-273.*

(Continued)

*Primary Examiner* — Jeffrey A. Gaffin
*Assistant Examiner* — Paulinho E Smith
(74) *Attorney, Agent, or Firm* — Zilka-Kotab, PC

(57) ABSTRACT

Embodiments of the present invention provide for a method of identifying customer service and duplicate questions submitted by a user to a consultation system by creating a model from features extracted from questions previously identified as customer service questions, extracting features from a newly submitted question by performing phrasal analysis of the question, comparing the extracted features of the newly submitted question to the extracted features of the model, and determining whether the newly submitted question is a customer service question.

1 Claim, 8 Drawing Sheets

(56) References Cited

U.S. PATENT DOCUMENTS

| | | | |
|---|---|---|---|
| 7,013,325 B1 | 3/2006 | Vivian et al. | |
| 7,058,626 B1 | 6/2006 | Pan et al. | |
| 7,146,128 B2 | 12/2006 | Okubo | |
| 7,146,358 B1 | 12/2006 | Gravano et al. | |
| 7,200,808 B1 | 4/2007 | Nagao | |
| 7,209,908 B2* | 4/2007 | Li et al. | 706/45 |
| 7,289,982 B2* | 10/2007 | Saito et al. | 1/1 |
| 7,376,893 B2 | 5/2008 | Chen et al. | |
| 7,454,393 B2 | 11/2008 | Horvitz et al. | |
| 7,516,113 B2 | 4/2009 | Horvitz et al. | |
| 7,672,831 B2 | 3/2010 | Todhunter et al. | |
| 7,739,215 B2 | 6/2010 | Horvitz et al. | |
| 7,783,622 B1 | 8/2010 | Vandermolen et al. | |
| 7,831,688 B2 | 11/2010 | Linyard et al. | |
| 7,962,326 B2 | 6/2011 | Tsourikov et al. | |
| 8,005,665 B2 | 8/2011 | Chaney et al. | |
| 8,046,472 B2 | 10/2011 | Kumar | |
| 8,150,750 B2 | 4/2012 | Ray | |
| 8,250,018 B2 | 8/2012 | Wong et al. | |
| 8,280,888 B1 | 10/2012 | Bierner et al. | |
| 8,332,394 B2 | 12/2012 | Fan et al. | |
| 8,392,360 B1 | 3/2013 | Dicker et al. | |
| 8,457,979 B2 | 6/2013 | Kurtzig et al. | |
| 8,463,648 B1 | 6/2013 | Bierner et al. | |
| 8,463,791 B1 | 6/2013 | Bierner et al. | |
| 8,473,499 B2 | 6/2013 | Song et al. | |
| 8,516,077 B2 | 8/2013 | Linyard et al. | |
| 8,606,739 B2 | 12/2013 | Apacible et al. | |
| 8,655,866 B1 | 2/2014 | Provine et al. | |
| 8,732,222 B2 | 5/2014 | Horvitz et al. | |
| 8,738,617 B2* | 5/2014 | Brown et al. | 707/731 |
| 2001/0021934 A1 | 9/2001 | Yokoi | |
| 2002/0010574 A1 | 1/2002 | Tsourikov et al. | |
| 2002/0023144 A1 | 2/2002 | Linyard et al. | |
| 2002/0065857 A1 | 5/2002 | Michalewicz et al. | |
| 2002/0087314 A1* | 7/2002 | Fischer et al. | 704/255 |
| 2002/0087496 A1 | 7/2002 | Stirpe et al. | |
| 2002/0116176 A1 | 8/2002 | Tsourikov et al. | |
| 2002/0184206 A1 | 12/2002 | Evans | |
| 2003/0028525 A1 | 2/2003 | Santos et al. | |
| 2003/0130837 A1 | 7/2003 | Batchilo et al. | |
| 2003/0140037 A1 | 7/2003 | Deh-Lee | |
| 2003/0144895 A1 | 7/2003 | Aksu et al. | |
| 2003/0172368 A1 | 9/2003 | Alumbaugh et al. | |
| 2003/0200079 A1 | 10/2003 | Sakai | |
| 2004/0006560 A1 | 1/2004 | Chan et al. | |
| 2004/0049499 A1* | 3/2004 | Nomoto et al. | 707/3 |
| 2004/0083224 A1 | 4/2004 | Yoshida | |
| 2004/0158337 A1 | 8/2004 | Forest | |
| 2004/0205448 A1* | 10/2004 | Grefenstette et al. | 715/500 |
| 2005/0055231 A1 | 3/2005 | Lee | |
| 2005/0086290 A1 | 4/2005 | Joyce et al. | |
| 2005/0131874 A1 | 6/2005 | Verbitsky | |
| 2005/0182743 A1 | 8/2005 | Koenig | |
| 2005/0266387 A1* | 12/2005 | Rossides | 434/323 |
| 2005/0278314 A1 | 12/2005 | Buchheit | |
| 2006/0036563 A1 | 2/2006 | Wu | |
| 2006/0041424 A1 | 2/2006 | Todhunter et al. | |
| 2006/0106788 A1 | 5/2006 | Forrest | |
| 2006/0149555 A1* | 7/2006 | Fabbrizio et al. | 704/275 |
| 2006/0167864 A1 | 7/2006 | Bailey et al. | |
| 2006/0287970 A1 | 12/2006 | Chess et al. | |
| 2006/0294037 A1 | 12/2006 | Horvitz et al. | |
| 2007/0005564 A1 | 1/2007 | Zehner | |
| 2007/0022109 A1 | 1/2007 | Imielinski et al. | |
| 2007/0094006 A1 | 4/2007 | Todhunter et al. | |
| 2007/0124266 A1 | 5/2007 | Hearing et al. | |
| 2007/0143238 A1 | 6/2007 | Kochunni et al. | |
| 2007/0160970 A1 | 7/2007 | Kaplan | |
| 2007/0203863 A1* | 8/2007 | Gupta et al. | 706/20 |
| 2007/0239874 A1 | 10/2007 | Lazaridis et al. | |
| 2007/0271256 A1* | 11/2007 | Chang et al. | 707/5 |
| 2008/0027783 A1 | 1/2008 | Hughes et al. | |
| 2008/0064018 A1 | 3/2008 | Griffin | |
| 2008/0077054 A1 | 3/2008 | Feuer et al. | |
| 2008/0126280 A1* | 5/2008 | Liu et al. | 706/20 |
| 2008/0147741 A1 | 6/2008 | Gonen et al. | |
| 2008/0160490 A1 | 7/2008 | Gomes et al. | |
| 2008/0215976 A1 | 9/2008 | Bierner et al. | |
| 2008/0243539 A1 | 10/2008 | Barish et al. | |
| 2008/0270169 A1 | 10/2008 | Kibar et al. | |
| 2008/0311934 A1 | 12/2008 | Soderstrom | |
| 2009/0055384 A1 | 2/2009 | Jain et al. | |
| 2009/0063463 A1 | 3/2009 | Turner et al. | |
| 2009/0112912 A1 | 4/2009 | Schimmel et al. | |
| 2009/0162824 A1* | 6/2009 | Heck | 434/322 |
| 2009/0177529 A1 | 7/2009 | Hadi | |
| 2009/0192966 A1 | 7/2009 | Horvitz et al. | |
| 2009/0204426 A1 | 8/2009 | Thorne et al. | |
| 2009/0276419 A1 | 11/2009 | Jones et al. | |
| 2010/0048229 A1 | 2/2010 | Rizzi | |
| 2010/0057569 A1 | 3/2010 | Cantelmo et al. | |
| 2010/0191686 A1* | 7/2010 | Wang et al. | 706/46 |
| 2010/0217603 A1 | 8/2010 | Hammond et al. | |
| 2010/0235311 A1 | 9/2010 | Cao et al. | |
| 2011/0004588 A1 | 1/2011 | Leitersdorf et al. | |
| 2011/0040592 A1 | 2/2011 | Kurtzig et al. | |
| 2011/0040662 A1 | 2/2011 | Kurtzig | |
| 2011/0040694 A1 | 2/2011 | Kurtzig et al. | |
| 2011/0041173 A1 | 2/2011 | Kurtzig et al. | |
| 2011/0078167 A1 | 3/2011 | Sundaresan et al. | |
| 2011/0131210 A1* | 6/2011 | Bierner | 707/740 |
| 2011/0131283 A1* | 6/2011 | Canning et al. | 709/206 |
| 2012/0095978 A1 | 4/2012 | Levin et al. | |
| 2012/0116844 A1 | 5/2012 | Menich et al. | |
| 2012/0130910 A1 | 5/2012 | Al-Alami | |
| 2012/0131033 A1* | 5/2012 | Bierner | 707/767 |
| 2012/0185888 A1* | 7/2012 | Eyer et al. | 725/13 |
| 2012/0197813 A1 | 8/2012 | Kurtzig et al. | |
| 2012/0197820 A1 | 8/2012 | Kurtzig et al. | |
| 2012/0303356 A1 | 11/2012 | Boyle et al. | |
| 2013/0041921 A1* | 2/2013 | Cooper et al. | 707/780 |
| 2013/0124532 A1 | 5/2013 | McQuarrie | |
| 2013/0132308 A1 | 5/2013 | Boss et al. | |
| 2013/0254153 A1* | 9/2013 | Marcheret | 706/59 |
| 2013/0268319 A1 | 10/2013 | Palombo | |
| 2013/0290225 A1* | 10/2013 | Kamath et al. | 706/12 |
| 2013/0290342 A1* | 10/2013 | Cooper et al. | 707/740 |
| 2013/0295546 A1* | 11/2013 | Bierner et al. | 434/350 |
| 2013/0297545 A1* | 11/2013 | Bierner et al. | 706/46 |
| 2013/0297553 A1* | 11/2013 | Bierner, Gann | 706/52 |
| 2013/0297625 A1* | 11/2013 | Bierner et al. | 707/754 |
| 2013/0304749 A1 | 11/2013 | Cooper | |
| 2013/0311476 A1* | 11/2013 | Bierner, Gann | 707/740 |
| 2013/0311903 A1 | 11/2013 | Zadeh et al. | |
| 2014/0003652 A1* | 1/2014 | Fedorovskaya et al. | 382/103 |
| 2014/0074826 A1* | 3/2014 | Cooper et al. | 707/722 |
| 2014/0114986 A1 | 4/2014 | Bierner et al. | |
| 2014/0156365 A1 | 6/2014 | Porter et al. | |

OTHER PUBLICATIONS

Wei Li, "Question Classificaiton Using Language Modeling", 2002, CIIR Technical Report: University of Massachusetts, pp. 1-7.*

Zhang et al., "Question Classification using Support Vector Machines", Aug. 1, 2003, SIGIR, pp. 1-7.*

Hermajakob, "Parsing and Question Classification for Question Answering", 2001, Proceedings of the Workshop on Open-Domain Question Answering at ACL, pp. 1-6.*

Radev et al., "Probabilistic Question Answering on the Web", May 11, 2002, pp. 408-419.*

Broder et al., "Syntatic Clustering of the Web", SRC Technical Note, Jul. 25, 1997, Digital Equipment Corporation, pp. 1-13.*

SFerra (www.seffra.com), Customer Service, http://www.sferra.com/content/100/customer-service.html, Oct. 11, 2011, pp. 1-4.*

Sears (www.sears.com), Customer Service, http://www.sears.com/shc/s/nb_10153_12605_NB_CSHome, Mar. 14, 2012, pp. 1-4.*

Broder et al., "Syntactic Clustering of the Web," SRC Technical Note, Jul. 25, 1997, Digital Equipment Corporation, pp. 1-13.

Huntington, D.; "Expert Systems for Online Advice: Knowledge at Your Fingertips," PCAI, Jul./Aug. 2000, pp. 26-27 and 49-50.

Muller et al., "Electronic Marketplaces of Knowledge: Characteristics and Sharing of Knowledge Assets," Proceedings of the Interna-

(56) References Cited

OTHER PUBLICATIONS tional Conference on Advances in Infrastructure for e-Business, e-Education, e-Science, and e-Medicine on the Internet, Jan. 2002, pp. 1-12.
Non-Final Office Action from U.S. Appl. No. 13/464,252, dated Jan. 14, 2015.
Non-Final Office Action from U.S. Appl. No. 13/464,269, dated Jan. 26, 2015.
Non-Final Office Action from U.S. Appl. No. 13/946,986, dated Apr. 3, 2015.
Non-Final Office Action from U.S. Appl. No. 14/176,007, dated Apr. 7, 2015.
Kurtzig et al., U.S. Appl. No. 12/854,836, filed Aug. 11, 2010.
Non-Final Office Action from U.S. Appl. No. 12/854,836, dated Jul. 18, 2012.
Kurtzig et al., U.S. Appl. No. 12/854,849, filed Aug. 11, 2010.
Non-Final Office Action from U.S. Appl. No. 12/854,849, dated Jun. 26, 2012.
Kurtzig et al., U.S. Appl. No. 13/439,743, filed Apr. 4, 2012.
Non-Final Office Action from U.S. Appl. No. 13/439,743, dated Jun. 28, 2012.
Final Office Action from U.S. Appl. No. 13/439,743, dated Mar. 27, 2013.
Non-Final Office Action from U.S. Appl. No. 13/439,743, dated Dec. 5, 2013.
Non-Final Office Action from U.S. Appl. No. 12/854,846, dated Feb. 13, 2014.
Notice of Acceptance from AU Application No. 2010282516 dated Jan. 31, 2014.
Just Answer, Help, 2004-2005 Just Answer! pp. 1-10 https://web.archive.org/web/20050828022539/http://www.justanswer.com/help.asp#FAQ54.
Yang et al., "Analyzing and Predicting Not-Answered Questions in Community-Based Question Answering Services," Proceedings of the Twenty-Fifth AAAI Conference on Artificial Intelligence, 2011, pp. 1273-1278.
Raben, D.R., "Self-Presentation and the Value of Information in Q&A Websites," Wiley INterscience, Aug. 7, 2009, pp. 2465-2473.
Liu et al., "You've got answers: Towards personalized models for predictingsuccess in community question answering," In Proceedings of the 46th Annual Meeting of the Association for Computational Linguistics (ACL), 2008, pp. 97-100.
Dror et al., "Will My Question be Answered? Predictiong "Question-Answerability" in Community Question-Answering Sites," Yahoo Labs, 2013, pp. 1-16.
Bierner et al., U.S. Appl. No. 13/946,982, filed Jul. 19, 2013.
Non-Final Office Action from U.S. Appl. No. 13/946,982, dated Jul. 15, 2014.
Final Office Action from U.S. Appl. No. 13/946,982, dated Dec. 8, 2014.
Advisory Action from U.S. Appl. No. 13/946,982, dated Mar. 23, 2015.
Final Office Action from U.S. Appl. No. 12/854,838, dated Mar. 20, 2015.
Final Office Action from U.S. Appl. No. 12/854,846, dated Apr. 7, 2015.
Kurtzig, A. P., U.S. Appl. No. 12/854,846, filed Aug. 11, 2010.
Non-Final Office Action from U.S. Appl. No. 12/854,846, dated Oct. 11, 2011.
Final Office Action from U.S. Appl. No. 12/854,846, dated Jun. 6, 2012.
Advisory Action from U.S. Appl. No. 12/854,846, dated Aug. 30, 2012.
Non-Final Office Action from U.S. Appl. No. 12/854,846, dated Dec. 18, 2014.
Kurtzig et al., U.S. Appl. No. 12/854,838, filed Aug. 11, 2010.
Non-Final Office Action from U.S. Appl. No. 12/854,838, dated Feb. 15, 2012.
Final Office Action from U.S. Appl. No. 12/854,838, dated Jul. 20, 2012.
Non-Final Office Action from U.S. Appl. No. 12/854,838, dated Oct. 2, 2014.
Kurtzig et al., U.S. Appl. No. 13/439,728, filed Apr. 4, 2012.
Non-Final Office Action from U.S. Appl. No. 13/439,728, dated Jul. 18, 2012.
Final Office Action from U.S. Appl. No. 13/439,728, dated Nov. 6, 2012.
Advisory Action from U.S. Appl. No. 13/439,728, dated Jan. 11, 2013.
Notice of Allowance from U.S. Appl. No. 13/439,728, dated Feb. 5, 2013.
Bierner et al., U.S. Appl. No. 13/464,167, filed May 4, 2012.
Non-Final Office Action from U.S. Appl. No. 13/464,167, dated Aug. 28, 2012.
Notice of Allowance from U.S. Appl. No. 13/464,167, dated Apr. 18, 2013.
Bierner et al., U.S. Appl. No. 13/464,196, filed May 4, 2012.
Notice of Allowance from U.S. Appl. No. 13/464,196, dated Aug. 13, 2012.
Bierner et al., U.S. Appl. No. 13/598,450, filed Aug. 29, 2012.
Notice of Allowance from U.S. Appl. No. 13/598,450, dated Feb. 26, 2013.
Bierner et al., U.S. Appl. No. 13/464,230, filed May 4, 2012.
Non-Final Office Action from U.S. Appl. No. 13/464,230, dated Oct. 16, 2013.
Final Office Action from U.S. Appl. No. 13/464,230, dated Apr. 23, 2014.
Advisory Action from U.S. Appl. No. 13/464,230, dated Jul. 30, 2014.
Bierner, G., U.S. Appl. No. 13/464,252, filed May 4, 2012.
Non-Final Office Action from U.S. Appl. No. 13/464,252, dated Jun. 11, 2014.
Bierner et al., U.S. Appl. No. 13/464,269, filed May 4, 2012.
Non-Final Office Action from U.S. Appl. No. 13/464,269, dated Apr. 25, 2014.
Palombo, G., U.S. Appl. No. 13/741,287, filed Jan. 14, 2013.
Non-Final Office Action from U.S. Appl. No. 13/741,287, dated Dec. 29, 2014.
Zadeh et al., U.S. Appl. No. 13/946,984, filed Jul. 19, 2013.
Bierner, G., U.S. Appl. No. 13/946,986, filed Jul. 19, 2013.
Cooper, E., U.S. Appl. No. 13/946,989, filed Jul. 19, 2013.
Porter et al., U.S. Appl. No. 14/176,007, filed Feb. 7, 2014.
Just Answer, Terms of Service, 2004-2005 JustAnswer! pp. 1-12 http://web.archive.org/web/20080509130156/http://www.justanswer.com/tos.aspx.
Just Answer, Expert Faq's, 2004-2005 JustAnswer! pp. 1 http://web.archive.org/web/20070208193005/http://www.justanswer.com/help_expertaspx.
Just Answer, Ask a Question, 2004-2005 Just Answer! pp. 1-2 http://web.archive.org/web/20080720171326/http://justanswer.com.
Just Answer, Expert Agreement, 2004-2005 JustAnswer! pp. 1-3 http://web.archive.org/web/20051127005457/http://www.justanswer.com/sa.asp.
International Preliminary Examination Report from International Application No. PCT/US2010/045232, dated Oct. 21, 2011.
International Search Report and Written Opinion from International Application No. PCT/US2010/045232, dated Oct. 1, 2010.
Supplementary European Search Report from EP Application No. 10808717.2, dated Jan. 21, 2014.
Coutu, A., "Consultation Fee Rates—Consultant Fees," Consultant Journal, May 26, 2006, pp. 1-5.
Phillips, M., "Get Expert Answers with JustAnswer," WebsiteMagazine.com, Aug. 29, 2008, pp. 1-2.
Non-Final Office Action from U.S. Appl. No. 13/464,230, dated Jul. 9, 2015.
Final Office Action from U.S. Appl. No. 13/464,269, dated Aug. 11, 2015.
Non-Final Office Action from U.S. Appl. No. 13/946,982, dated Jun. 29, 2015.

* cited by examiner

METHOD AND APPARATUS FOR IDENTIFYING CUSTOMER SERVICE AND DUPLICATE QUESTIONS IN AN ONLINE CONSULTATION SYSTEM

RELATED APPLICATIONS

The present application is related to U.S. patent application Ser. No. 12/854,838 filed on Aug. 11, 2010, U.S. patent application Ser. No. 12/854,836 filed on Aug. 11, 2010, U.S. patent application Ser. No. 12/854,849 filed on Aug. 11, 2010, and U.S. patent application Ser. No. 12/854,846 filed on Aug. 11, 2010, which are all incorporated herein by reference. The present application is also related to and incorporates by reference the below applications filed on the same day as the present invention, and entitled "Method and apparatus for automated topic extraction used for the creation and promotion of new categories in a consultation system," "Method and Apparatus for creation of web document titles optimized for search engines," "Method and apparatus for identifying and eliciting missing question details in a consultation system," and "Method and apparatus for identifying similar questions in a consultation system," by the same inventors, Gann Bierner and Edwin Cooper, and the application entitled "Method and apparatus for predicting question answerability in an online consultation system," by Gann Bierner as the inventor.

FIELD OF INVENTION

The present application generally relates to the field of computer technology and, in specific exemplary embodiments, to methods and systems for automatically identifying customer service questions, help questions and duplicate questions in an online consultation system.

BACKGROUND

As Internet use becomes more common, a greater number of users with less technological sophistication are accessing the web. Websites owners are trying to accommodate the less tech savvy users by providing a more user friendly interface, a key component of which is a less cluttered, simple to view, use and interact with web page (also referred to as a landing page). Google®, the popular search engine is one example of this web page design philosophy. Google's landing page has as its center piece the question box where users must enter their query and the majority of the users' interactions with the website is through this question box. Other companies have tried to emulate this simplified design philosophy by creating landing pages with a few strategically laid out functional icons, and a simplified portal for user interaction with the website, with the goal of improving the user experience reducing confusion of the less sophisticated users. Presently, many online websites allow for exchange of information. Some of these websites provide a question and answer type capability whereby a user may post a question and one or more other users may reply. One example of an online consultation system is a question and answer website that allows users to ask questions for a fee of vetted experts, on a variety of topics. Among the many benefits and attractions of such a system is the ability of the users to receive answers tailored to their specific problem, from actual experts on specific subject matters. Another benefit of such an online consultation system is the access to experts and answers at any time of the day and night.

A large portion of the users of our exemplary online consultation system may be comprised of Internet users that are less sophisticated when it comes to navigating their way around the Internet, or finding their way around a web site. To better serve the less technology savvy users, a simple web page interface is desired. However, such an interface presents unique issues. Less technically savvy users may use the landing page question box to submit non-expert related questions. For example, the users may submit customer service questions such as request for a refund, or questions regarding their account. Alternatively, the users may use the question box to submit system help questions, asking for help on using the online consultation system's various features. Another type of non-expert related question may be duplicate or near duplicate questions. Users may resubmit a question if they have not received an answer to their question within the time they were waiting. Alternatively, users may resubmit the same question with additional information to supplement a previously submitted question. The question box interface is primarily designed to receive expert related questions with the goal of receiving tailored answers from subject matter experts on a given topic. So, customer service questions, help questions and duplicate questions require special handling.

BRIEF DESCRIPTION OF DRAWINGS

The appended drawings are merely used to illustrate exemplary embodiments of the present invention and cannot be considered as limiting its scope.

DETAILED DESCRIPTION

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on quality control of experts, the embodiments are given merely for clarity and disclosure. Alternative embodiments may employ other systems and methods and are considered as being within the scope of the present invention.

Embodiments of the present invention provide systems and methods for automatically identifying missing details in questions and either automatically supplementing the details or soliciting the details from the user. In exemplary embodiments, the content of a question is analyzed and the missing information required for a satisfactory answer is supplemented using concept matching along with the use of an existing ontology.

Exemplary embodiments of the present invention further provide systems and methods for promoting a more efficient operation of an online question and answer site through automation of parts of the user and expert interactions.

In order to clarify the application of the present invention, an online web site and consultation system is used as an illustrative example. It would be apparent to one of skill in the art that the teachings of the present invention are not limited to the examples used herein and the systems and methods of the present invention have broader applications.

Figure 1:
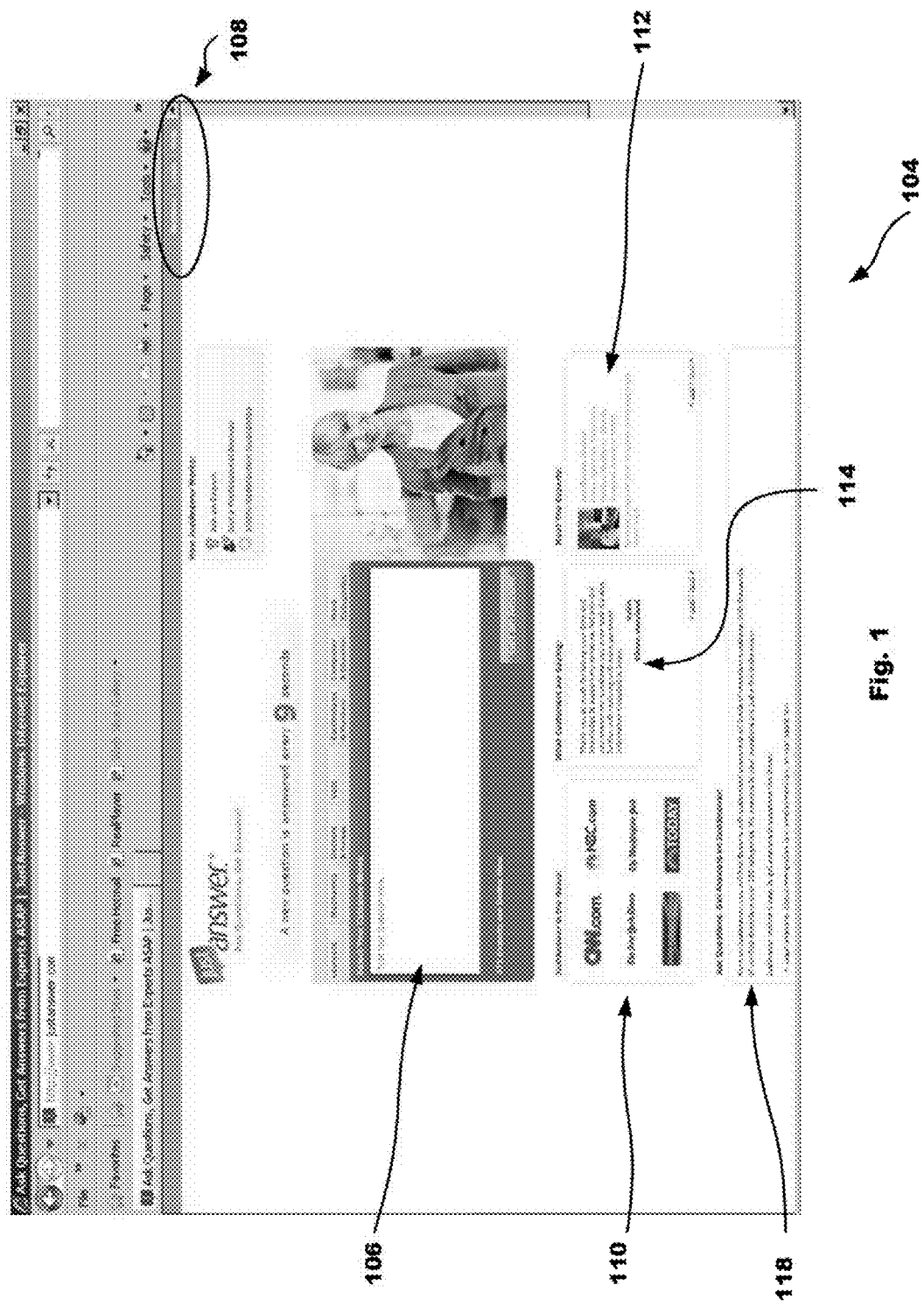
FIG. 1 is an illustrative example of an online consultation landing webpage.

FIG. 1 illustrates an exemplary online consultation system 102 landing page 104, designed with the goal of creating a simple and easy to use user interface. As seen in FIG. 1, the center piece of the web page 104 is the question box interface 106 (also referred to as the question field). The question box 106 is by the design the most prominent feature in the web page 102, designed to help the user immediately focus on the question box 106. Using the question box 106, the user may enter his or her question for submission to the experts through the online consultation system 102. The web page 104 includes other sections including the registration and login section 108, the informational section 110, the featured experts section 112, a testimonial section 114, and the terms of service section 116 providing access to the terms of service and various other features the consultation system 102 offers.

Due to the prominence of the question box 106, users in general and less tech savvy users in particular may tend to use the question box 106 for purposes other than its intended purpose of submitting questions with the goal of receiving an answer from an expert on a particular subject matter. For example, users may submit customer service questions through the question box 106, or in an attempt to edit their previously submitted question, they may unintentionally submit a second question on the same issue through the question box 106. Efficient and responsive customer service is the goal of any organization. A successful online consultation system 102 may include hundreds of categories, have tens of thousands of visitors to the site, and receive thousands of questions submitted through the portal of question box 106. In order to provide responsive and efficient customer service, the customer service questions directed at system administrators and duplicate questions submitted by mistake have to be filtered out and dealt with in a different manner than the substantive questions directed to the experts. Manual filtering of the large number of the questions is costly, and inefficient. Therefore, an automated system that can identify and filter out customer service questions, near duplicate or duplicate questions is highly desirable.

Figure 2:
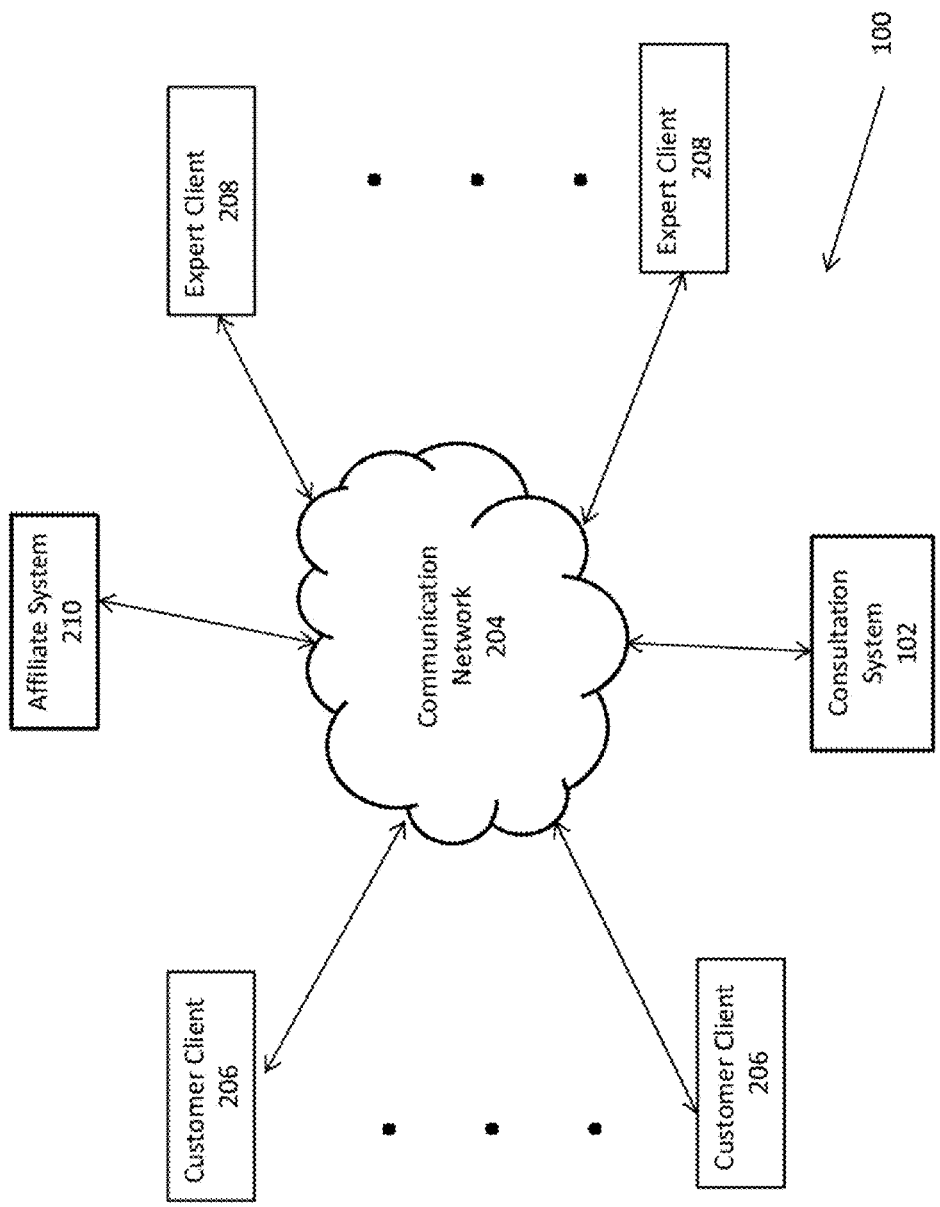
FIG. 2 is a diagram of an exemplary environment in which embodiments of the present invention may be practiced.

FIG. 2 is a diagram of an exemplary environment in which embodiments of the present invention may be practiced. The exemplary environment 200 comprises a consultation system 102 coupled via a communications network 204 to one or more users 206 and expert users 208. User 206, client, customer, customer client refers to a user of the consultation system 102. The communication network 204 may comprise one or more local area networks or wide area networks such as, for example, the Internet and telephone systems.

In exemplary embodiments, the consultation system 102 provides a forum where users may post or pose questions for which experts may provide answers. The consultation system 102 may provide the forum via a website. In some embodiments, at least portions of the forum (e.g., asking of questions or receiving of responses) may occur via the website, mobile phone, other websites, text messaging, telephone, video, VoIP, or other computer software applications. Because the consultation system 102 is network based e.g., Internet, public switched telephone network (PSTN), cellular network, the users using the consultation system 102 and experts providing answers may be geographically dispersed (e.g., may be located anywhere in the world). As a result an expert may provide answers to a user thousands of miles away. Additionally, the consultation system 102 allows a large number of users and experts to exchange information at the same time and at any time.

By using embodiments of the present invention, a user posting a question may easily obtain a tailored answer. Accordingly, one or more of the methodologies discussed herein may obviate a need for additional searching for answers, which may have the technical effect of reducing computing resources used by one or more devices within the system. Examples of such computing resources include, without limitation, processor cycles, network traffic, memory usage, storage space, and power consumption.

In various embodiments, a user may pose a question and one or more experts may provide answers. In various embodiments, the question may be matched with a category of experts, more specific set of experts, or even individual experts, sometimes on a rotating basis by user selection, a keyword based algorithm, a quality based algorithm (or score or rating), or other sorting mechanism that may include considerations such as, for example, likely location or tune zone. A back-and-forth communication can occur. In some cases, a user may resubmit a previously submitted question in an attempt to revise or supplement the previously submitted question. Therefore, in most cases, the resubmitted question may be similar but not identical to the first question posted by the user. It is desirable for a sophisticated user interface of an the online consultation system 102 to be able to identify such substantially duplicate questions and process them differently so that the user is not charged twice, or an expert does not end up duplicating the effort of another expert by answering a question that has already been submitted and being answered by the other expert. Absent the capability to identify and process such duplicate questions, both users and experts may have a negative experience using the online consultation system 102.

Similarly, it is necessary that customer service questions submitted by users through the question box 106 interface be identified and filtered out. Otherwise, users may get charged a fee for submitting a customer service question through the question box 106. Additionally, experts may end up spending time to redirect customer service questions to the online consultation system 102 administration. Since the experts receive compensation only for answering questions, any time spent on administrative matters ends up being uncompensated time leading to expert dissatisfaction.

The user may accept an answer provided by one or more of the experts. In an alternative embodiment, the user may be deemed to have accepted the answer if the user does not reject it. By accepting the answer, the user validates the expert's answer which, in turn, may boost a score or rating associated with the expert. The user may also pay the expert for any accepted answers and may add a bonus. The user may also leave positive, neutral or negative feedback regarding the expert. More details regarding the consultation system 102 and its example functions will be discussed in connection with FIG. 3 below.

The exemplary user 206 is a device associated with a user accessing the consultation system 102 (e.g., via a website, telephone number, text message identifier, or other contact means associated with the consultation system 102). The user may comprise any individual who has a question or is interested in finding answers to previously asked questions. The user 206 comprises a computing device (e.g., laptop, PDA, cellular phone) which has communication network access ability. For example, the user 206 may be a desktop computer initiating a browser for access to information on the communication network 204. The user 206 may also be associated with other devices for communication such as a telephone. In exemplary embodiments, the user would provide access to the online consultation system 102 through a user interface such as the exemplary landing web page 104 of FIG. 1, previously discussed.

In exemplary embodiments, the expert user 208 is a device associated with an expert. The expert, by definition, may be any person that has, or entity whose members have, knowledge and appropriate qualifications relating to a particular subject matter. Some examples of expert subject matters include health (e.g., dental), medical (e.g., eye or pediatrics), legal (e.g., employment, intellectual property, or personal injury law), car, tax, computer, electronics, parenting, relationships, and so forth. Almost any subject matter that may be of interest to a user for which an expert has knowledge and appropriate qualifications may be contemplated. The expert may, but does not necessarily need to, have a license, certification or degree in a particular subject matter. For example, a car expert may have practical experience working the past 20 years at a car repair shop. In some embodiments, the expert may be a user (e.g., the expert posts a question).

The expert user 208 may comprise a computing device (e.g., laptop, PDA, cellular phone) which has communication network access ability. For example, the expert user 208 may be a desktop computer initiating a browser to exchange information via the communication network 204 with the consultation system 102. The expert user 208 may also be associated with other devices for communication such as a telephone.

In accordance with one embodiment, an affiliate system 210 may be provided in the exemplary environment 100. The affiliate system 210 may comprise an affiliate website or other portal which may include some of the components of the consultation system 102 or direct their users to the consultation system 102. For example, the affiliate system 210 may provide a website for a car group. A link or question box may be provided on the affiliate website to allow members of the car group to ask questions. The environment 100 of FIG. 1 is exemplary. While only one consultation system 102 is shown in the environment 100, alternative embodiments may comprise more than one consultation system 102. For instance, the consultation systems 102 may be regionally established.

Figure 3:
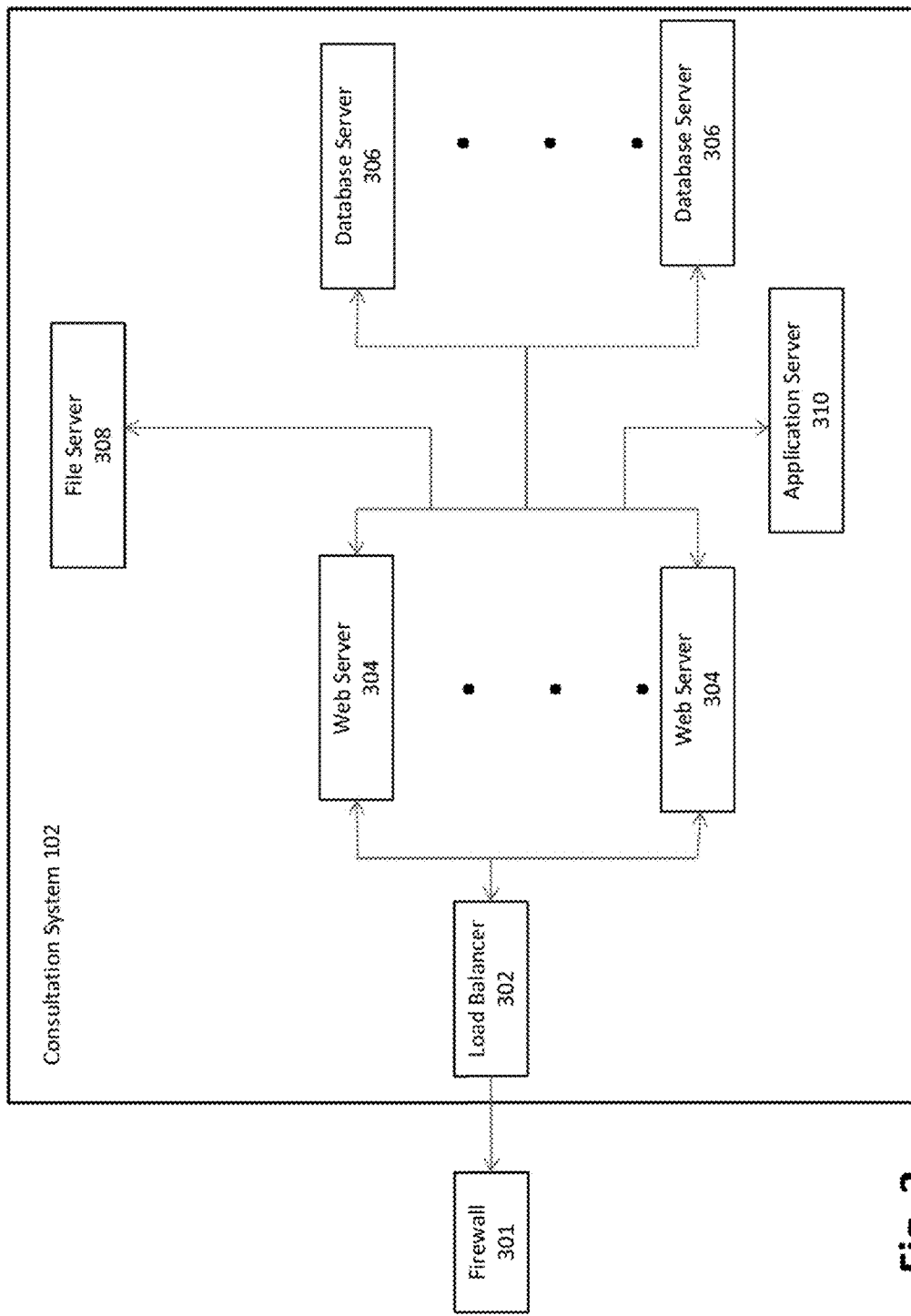
FIG. 3 is a block diagram of an exemplary consultation system.

Referring now to FIG. 3, the consultation system 102 is shown in more detail. In exemplary embodiments, the consultation system 102 may comprise a load balancer 302 which distributes work between two or more web servers 304 in order to optimize resource utilization and minimize response time. In some embodiments, a firewall 301 may be provided prior to the load balancer 302.

In exemplary embodiments, the web servers 304 are responsible for accepting communications from the user 206 (e.g., request or question) and expert user 208 (e.g., response) and serving the response including data content. In some instances, the request and response may be in HTTP or HTTPS which will result in HTML documents and linked objects (e.g., images) being provided to the user and expert users 206 and 208. The communications may include, for example, questions from the users, answers from the experts, acceptance from the user, payment information, account update information, videos, documents, photographs and voice. The web server 304 will be discussed in more detail in connection with FIG. 4.

Information used by the web server 304 to generate responses may be obtained from one or more database servers 306 and a file server 308. The exemplary database servers 306 store data or are coupled with data repositories storing data used by the consultation system 102. Examples of data include user information (e.g., username, e-mail address, credit card or other payment information), expert information (e.g., name, licenses, certifications, education and work history), previously asked questions and corresponding answers, and transaction information (e.g., payment, accepts, etc.). Essentially any data may be stored in, or accessed by, the database servers 306 including every user and expert interaction with the consultation system 102. Examples of interactions include how many questions the user has asked, which experts provided answers to the questions, and whether the user accepted the answers and paid the expert.

Content on the database servers 306 (or accessed by the database servers 306) may be organized into tables, and the tables may be linked together. For example, there may be one table for every question that has been previously asked, another table for posts (e.g., answers) to each question, and other tables for users and experts. In some embodiments, the database servers 306 may include logic to access the data stored in the tables. The logic may comprise a plurality of queries (e.g., thousands of queries) that are pre-written to access the data.

It should be noted that the functions of the database server 306 may be embodied within the web server 304. For example, the database servers 306 may be replaced by database storage devices or repositories located at the web servers 304. Therefore, any reference to the database server 306 and database storage device are interchangeable. Alternatively, some or all of the query logic may be embodied within the web server 304.

In exemplary embodiments, a plurality of database servers 306 is provided. The plurality of database servers 306 may share data and thus be identical (or close to being identical). By having identical database servers 306, load balancing and database backup may be provided.

The file server 308 stores or accesses files such as, for example, pictures, videos, voice files, PDF documents, Word documents, and PowerPoint presentations. When a particular file is requested or required in order to generate a response, the web server 304 may query the file server 308 for the file. Alternatively, the files may be stored at the database server 306 or other database storage devices, for example.

An application server 310 may also be provided in the consultation system 102. The application server 310 may provide applications and functions that are centralized to the consultation system 102. For example, the application server 310 may perform credit card processing with a bank that is coupled to the consultation system 102 via a network (e.g., the communication network 204).

It should be appreciated that in alternative embodiments, the consultation system 102 may include fewer or more components than shown in FIG. 3. For example, the consultation system 102 may comprise any number of web servers 304, database servers 306, file server 308, and application server 310. In another example, the file server 308 and application server 310 may be removed from the consultation system 102 and their functions performed by other servers in the consultation system 102. It will also be appreciated that the various servers may be embodied within each other and/or the consultation system 102 may be embodied within a single server. For example, the database server 306 may be embodied, as a storage device within the web server 304. It is also noted that the various servers of the consultation system 102 may be geographically dispersed within the exemplary environment 100.

Figure 4:
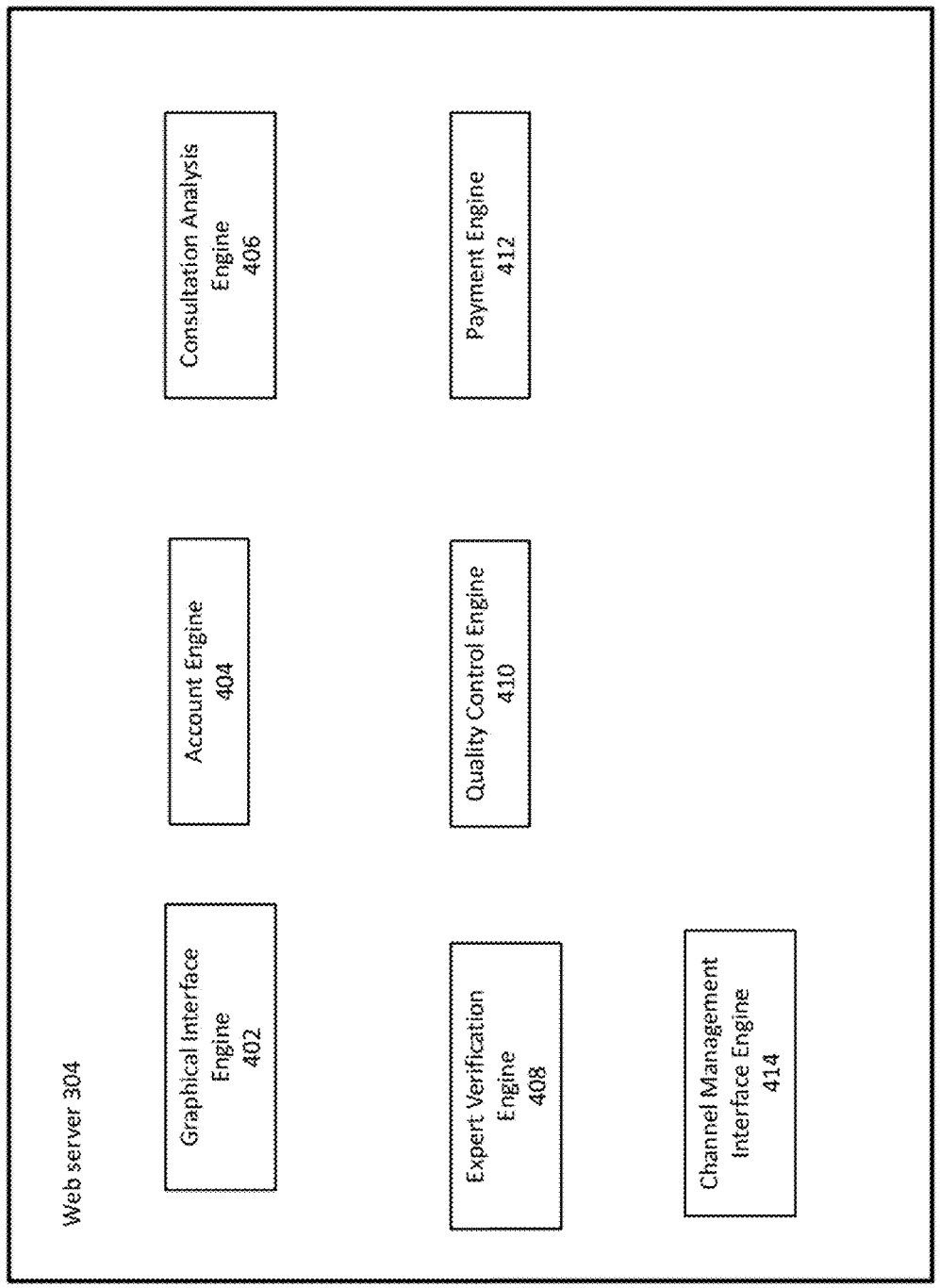
FIG. 4 is a block diagram of an exemplary web server.

Referring now to FIG. 4, one of the exemplary web servers 304 is shown in more detail. As discussed, the web servers 304 share in the workload in order to provide optimized performance. As such, each of the web servers 304 will include similar engines and modules. In the exemplary embodiment of FIG. 4, the web server 304 comprises a graphical interface engine 402, an accounts engine 404, a consultation analysis engine 406, an expert verification engine 408, a quality control engine 310, a payment engine 412, and a channel management engine 414 communicatively coupled together.

The exemplary graphical interface engine 402 generates graphical representations provided via the web page. In exemplary embodiments, the graphical interface engine 402 builds a web page 104 (e.g., made up of HTML, Javascript, CSS, sound, video, images, and other multimedia) that is presented to the user 206 or expert user 208. The web page 104 comprises static text (e.g., "Welcome to JustAnswer.") and dynamic data (e.g., "Hello, hulagirl. You joined 3 months ago; have asked 17 questions; have accepted 12 answers."). The dynamic data may be obtained, at least in part, from the database servers 306. In exemplary embodiments, the dynamic data may be retrieved using querying logic associated with the web server 304, the database server 306, or a combination of both, as discussed above. In exemplary embodiments, the web page 104 also includes a question box 106 prominently positioned within the web page, allowing the users to interact with the online consultation system 102 by submitting their questions.

The exemplary accounts engine 404 sets up, and maintains user accounts with the consultation system 102. Initially, the accounts engine 404 may provide a registration page via the graphical interface engine 402 for an individual (e.g., a user or expert) to fill out. The information collected via the registration page may be stored in the database server 306. Examples of information include user name, e-mail address, and billing and payment information. With respect to experts, the accounts engine may also collect information regarding the identity of the expert, information on credentials (e.g., license and certification numbers, degrees including university attended and years of attendance, employment history), and other data relating to the expert and the expert's application. Accounts for users may be automatically established and activated based on certain actions taken by the user, such as asking a question, agreeing to the terms of the consultation system, or providing payment. However, experts, in accordance with exemplary embodiments, proceed through an acceptance and verification process. If accepted, an expert account may then be established and activated by the accounts engine 404.

The consultation analysis engine 406 manages answers in response to questions which have been posted to the consultation system 102. In exemplary embodiments, the consultation analysis engine 406 will receive questions, along with the selection by the user of a category or subject matter corresponding to each question. In various embodiments, a user may utilize the question field 106 to enter a question which the user wants expert to answer. As previously discussed, some users may use the question box interface 106 to submit substantially duplicate questions, system help questions (questions on how to use the system, etc.), or customer service questions (questions related to refunds, their account, etc.). In such cases, the user may still select a particular category for the question, assuming for example that the duplicate question or customer service question he or she is about to submit has to be related to the same category as his or her previously submitted question. In such cases, the customer service or duplicate question will be posted as a regular question and presented to experts for answering unless these questions are identified and filtered out for special treatment.

An example of a user submitted question may be how to change the battery in a certain type of car. Such a question may be categorized as a car question or a question for that type of car. In some embodiments, the question will then be posted to a car care portion (e.g., car care web pages) of the consultation system 102. The question is also recorded into a corresponding table in the database server 306 (e.g., in a question table) and the user name of the user may also be entered into a corresponding table (e.g., user table). The user may also provide an amount that the user is willing to pay for an accepted answer.

Once the question is posted on the consultation system 102, experts may provide answers in response to the question. The questions may be posted to a general or subject matter specific question list of recent questions that have been posted by users, a more specific group of experts, or certain experts one-at-a-time. In various embodiments, the question list may be sorted by certain types of information such as time of posting, the amount the user is willing to pay (e.g., value), the user's history of accepting previous answers, information regarding the subject matter of the question, or whether replies have been previously posted. Experts may periodically review the question list or other communications alerting them to questions to determine if there are any questions that the expert would like to answer. The expert may base their determination, in part, on the complexity of the question, their expertise, the amount the user is willing to pay for an answer, or the user's history of accepting previous answers. In various embodiments, the user is able to place a deposit and name a price for an answer when posting the question or place the deposit after an expert has answered.

Should the expert decide to answer a question or request further information, an indication through email, text messaging, or other means is provided to the user that there is an answer being offered or a request for further information, sometimes in the form of the answer or the request itself. Once the expert has completed drafting his or her answer, the answer is provided to the user. The answer may be displayed on a web page (e.g., an answer page), provided via a chat session, provided via a voice or text message, provided via video, provided by a software application, provided by other social media means (e.g., social networking sites where the user has a personal profile or page), or provided by telephone, mobile phone, or VoIP. Upon review of answers posted in response to a question, the user decides if any of the answers are acceptable to the user. The user may accept one or more answers that are posted. When the user accepts an answer, monies from the deposits may also be paid to a host of the question and answers platform (e.g., host of the consultation system 102).

In various embodiments, different pricing options may be used for determining what a user may pay for getting an answer to a question or what an expert may be paid for providing an answer. Question price may vary based on factors such as question length, time of day, day of week, location, or the ability of a user to pay and discounts and promotions. In other embodiments, pricing may be selected and paid for by third-parties (e.g. employers of the users). In yet other embodiments, a user may subscribe to a subscription plan (e.g., unlimited questions each month for a particular fee or up to 10 questions each month for another fee). Acceptance and non-acceptance actions are tracked by the consultation analysis engine 406. For example, every user's accept-to-question ratio may be tracked and may be published to experts. Thus, if the ratio is low, experts may not answer the user's questions in the future. Furthermore, the user's question posting privileges may be suspended or the user may be removed from the consultation system 102 if the ratio is low or falls below a ratio threshold. The tracked acceptance and non-acceptance information is stored to the database server 306, and may be used to evaluate the quality of the experts as is discussed herein.

The user may also provide comments and feedback after viewing or accepting one or more answers. The feedback may be provided as, for example, a written comment, star rating, numerical scale rating, or any other form of rating. The feedback is stored to the database server 306, and may be used in the quality control processing. User satisfaction surveys may also be sent to collect data on the user's experience with the site, the expert, or the answer the user received.

According to some embodiments, if a user submitted question has been previously answered, a query of the database server 306 may be performed. The answers to previously asked questions may be stored in corresponding answer tables in the database server 306. These embodiments may occur when, for example, a user searches (e.g., using Google) for previous questions and answers. Multiple instances of access to the same questions and/or answers may be provided via a cache. Some or all users may also be allowed to search some or all previous questions or answers via a search tool on the website, or some or all previous questions or answers may be displayed to users at the discretion of the host, affiliate, or expert of the consultation system.

The exemplary expert verification engine 408 performs verification and acceptance of experts. In accordance with exemplary embodiments, the expert verification engine 408 verifies information provided by the potential experts (or experts) or receives verification data used to verify the experts' identities or credentials. The verification may occur prior to allowing the expert to join the consultation system 102. Alternatively, the verification may occur any time after the expert has joined the consultation system 102. More than one verification may be performed for each expert, by requirement or by the expert's choice.

In exemplary embodiments, the quality control engine 410 evaluates experts in order to promote the high quality of experts in the consultation system 102. The evaluation may comprise scoring or ranking experts based on various elements. For example, the quality control engine 410 may access and review feedback associated with each expert and score each expert accordingly. The quality control engine 410 may also review other factors which may increase or decrease an expert's score or ranking. The exemplary payment engine 412 manages pricing options and the payment of fees. In accordance with exemplary embodiments, users pay experts for accepted answers to their questions, for example, by way of payments per questions, payments per answers, payments per time frame, or payments on a subscription basis. In some instances, the user may provide a deposit in order to view answers prior to accepting the answers. The payment engine 412 may maintain a record of all these transactions. Additionally, the payment engine 412 may work with the application server 310, if provided, to process payments (e.g., credit card processing, PayPal processing).

The exemplary channel management engine 414 manages the creation of new channels in the consultation system 102. A new channel may comprise a new category or a new affiliate relationship on the consultation system 102. In some embodiments, the new category may be placed on a test site of the consultation system 102. However, questions may be posted to a main site of the consultation system 102 so that experts on the main site may also provide responses to the questions. Should the new category prove to be successful, the new category may then be moved to a main site of the consultation system 102. The new affiliate relationship results in the affiliate system 210 being linked to the consultation system 102.

Figure 5:
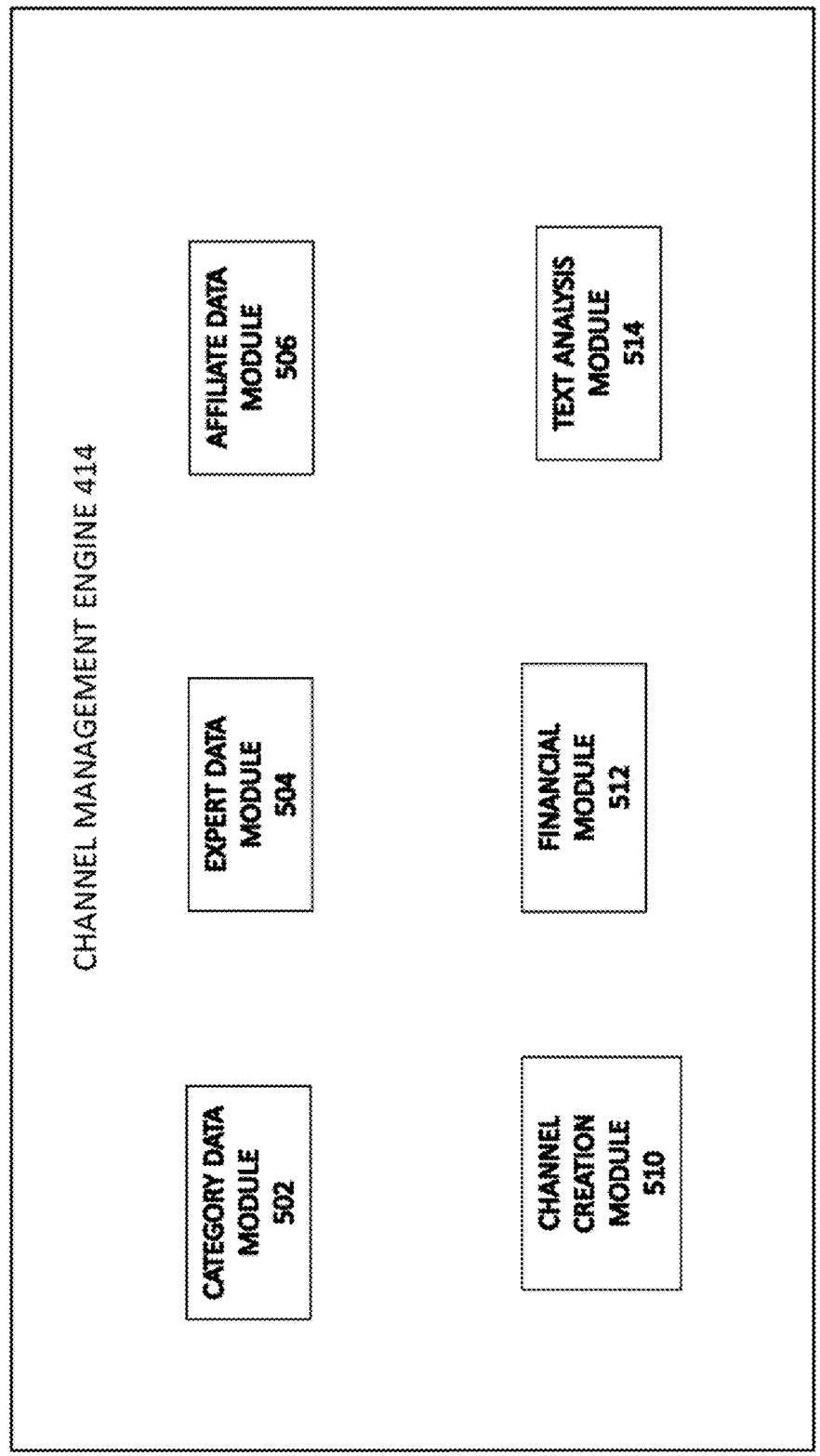
FIG. 5 is a block diagram of an exemplary consultation analysis engine.

FIG. 5 is a block diagram of the consultation analysis engine 406. The consultation analysis engine 406 manages the questions and answers exchanged through the online consultation system 102, as well as other user and expert interactions such as processing answers or managing expert ratings. In exemplary embodiments, the consultation analysis engine 406 comprises a category question processing module 502, a category selection module 504, an expert notification module 506, an answer processing module 508, a user feedback module 510, and text analysis module 514, communicatively coupled together. It is noted that some of the modules of the consultation analysis engine 406 may be embodied in other components of the consultation system 102. For example, the text analysis module 514 may be embodied in the channel management engine 414. Alternatively, the text analysis module 514 and the answer processing module 508 may be both be combined and be a part of the question processing module 502.

The question processing module 502 receives and processes questions submitted by users to the consultation system 102. Users may post their questions to the consultation system 102's website directly or indirectly. Users may reach the landing web page 104 through one of many affiliate websites. In most cases, regardless of how the user arrives at the landing page, the basic elements of the landing page may be similar, including a question box 106 for the user to submit his or her question, and subsequent pages that create the funnel through which the user may be guided and asked to provide personal information such as contact email, age and gender, as well payment information and other account details.

In addition, the question processing module 502 may include filtering capability to filter any personal information such as phone numbers or address out of the submitted question in order to protect the users' privacy.

The category selection module 504 operates to assign the question to the correct category. In one embodiment of the present invention, the category selection module 504 may process the user's selection of a category and assign the question to the user selected category. In alternative embodiments, an automated text analysis module 514 may process the question content and automatically assign a category the submitted question. In yet another embodiment, the category selection module 504 may assign the question based on affiliate channel through which the user is posting the question. For example, if an affiliate site is related to cars, questions generated from that affiliate website may be automatically directed to the car category.

The expert selection module 506 presents the posted user question to the right expert or group of experts. In one embodiment of the present invention, the expert selection may be based on input from the user. In an alternative embodiment, the expert selection is based on the question category. Therefore, if a particular expert was not selected by the user, the expert selection module may present the question to any expert qualified in the given category to answer the question.

In an exemplary embodiment of the present invention, an answer processing module 508 may process expert responses to posted questions, in the same manner the question processing module 502 processes user questions. In an alternative embodiment, the answers may be processed by the question processing module 502. In some exemplary embodiments of the present invention, the answer processing module 508 may send a notification to the user informing the user that his or her submitted question has been accepted by an expert or alternatively have been answered by an expert. The user may have to log back into the consultation system 102 to view and accept the posted answer and ask follow up questions if any.

In one exemplary embodiment of the present invention, the text analysis module 514 may be an independent module of the consultation analysis engine 406. In an alternative embodiment, the text analysis module 514 may be embodied in the question processing module 502. In an alternative embodiment, the text analysis module 514 may be embodied as part of the answer processing module 510. In yet another embodiment the text analysis module 514 may be incorporated in the channel management engine 414.

In various embodiments of the present invention, in general terms, the text analysis module 514 receives as input texts from questions or answers, and by applying various linguistic and/or statistical models; it processes the content of the text input. A feature extraction component of the text analysis module 514 uses the processed text input along with a desired set of rules to extracts relevant features from text. The text analysis module 514 produces a desirable outcome (extracted features) based on the text input. In some implementation of the text analysis module 514, the given model may be perfected by allowing an iterative training to tweak and optimize the model. Additionally, in alternative embodiments of the present invention, various smoothing operations may be performed to for example change extracted feature weights or drop non-relevant features all together.

Furthermore, the text analysis module 514 has the ability to recognize and output topics and its variants.

In the present invention, the text analysis module 514 is used to perform linguistic analysis of the body of a question, and parse and identify the sentence components of the question. The text analysis module 514 is further described below in FIG. 6.

Figure 6:
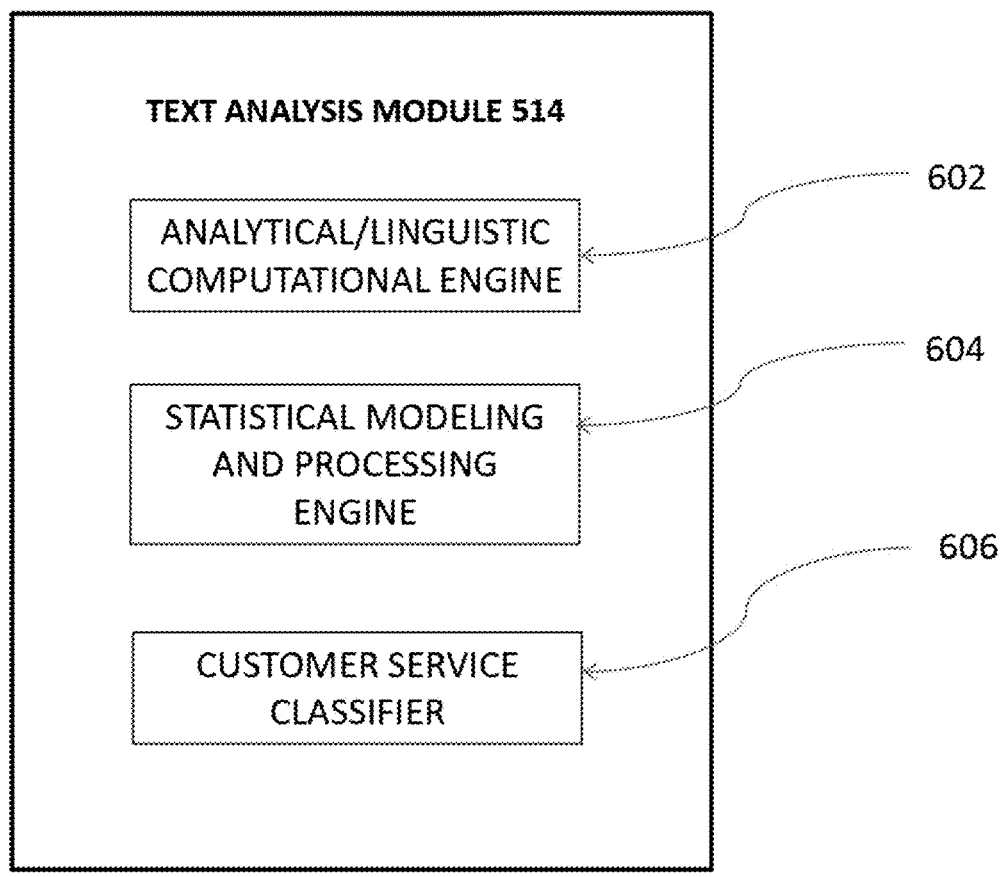
FIG. 6 is an exemplary block diagram of the text analysis module as applied to identifying customer service questions and duplicate questions.

FIG. 6 is an exemplary block diagram of the text analysis module as applied to automatic identification of customer service questions. The exemplary consultation system 102 of the present invention may include hundreds of categories and subcategories of topics, where in each category and subcategory, many verified and vetted experts are available to answer user questions. A successful consultation system 102 may have thousands of users submit questions in each of the many topic categories, generating a large quantity of very relevant and specific content. Furthermore, the users may find the consultation system 102 either directly or through affiliate websites.

Referring now to FIG. 6, the exemplary text analysis module 514 may include an analytical/computational linguistic engine 602 (hereinafter referred to as the linguistic engine), a statistical modeling engine 604, and a customer service question classifier 606. The following definitions shall apply to the description in this application.

A phrase is two or more adjacent words that may form a single syntactic unit. A token is a word or other atomic element of a sentence.

In an exemplary embodiment of the present invention, the linguistic engine 602 performs computational linguistics to parse the question under analysis into its individual components. The linguistic engine 602 may perform some or all of the following tasks: sentence detection, tokenization, phrase extraction, tagging of speech parts. The linguistic engine 602 receives as input a given text, in this case the question posted by a user, and the linguistic engine identifies the sentence components comprising the text. For example, the linguistic engine 602 may tokenize the sentence components and breaks down the question into component parts of various levels of abstraction: words, phrases, parts of speech (e.g. noun, adjective, etc.), concepts, etc. The process flow of the various operations performed by the linguistic engine 602 will be further described in reference to FIG. 7, herein below.

Word segmentation (identifying a sentence's component words or concepts) can be performed both algorithmically and statistically. In one exemplary embodiment of the present invention, a statistical modeling approach may be used to improve accuracy of the word segmentation.

In an exemplary embodiment of the present invention, the statistical modeling engine 604 creates a statistical model of the question features extracted from the questions analyzed by the linguistic engine 602, based on questions previously identified by administrators or experts as customer service. In one embodiment of the present invention, the statistical modeling engine 604 counts each occurrence of a given question feature. In alternative embodiments of the present invention, the statistical modeling engine 604 may include filtering capabilities to further process the extracted question features. In an exemplary embodiment, a customer service question classifier 606 may be used to compare the features extracted from the newly submitted question to the question features of the statistical model for customer service questions. The comparison will tag a question as a customer service question if the similarities are above a certain threshold. The ultimate output of the customer service question classifier 606 may be a probability value that the newly submitted question is a customer service question. Therefore, in exemplary embodiments of the present invention, the user may be asked to confirm whether his or her submitted question is a customer service question thus confirming the determination made by the customer service question classifier 606.

Figure 7:
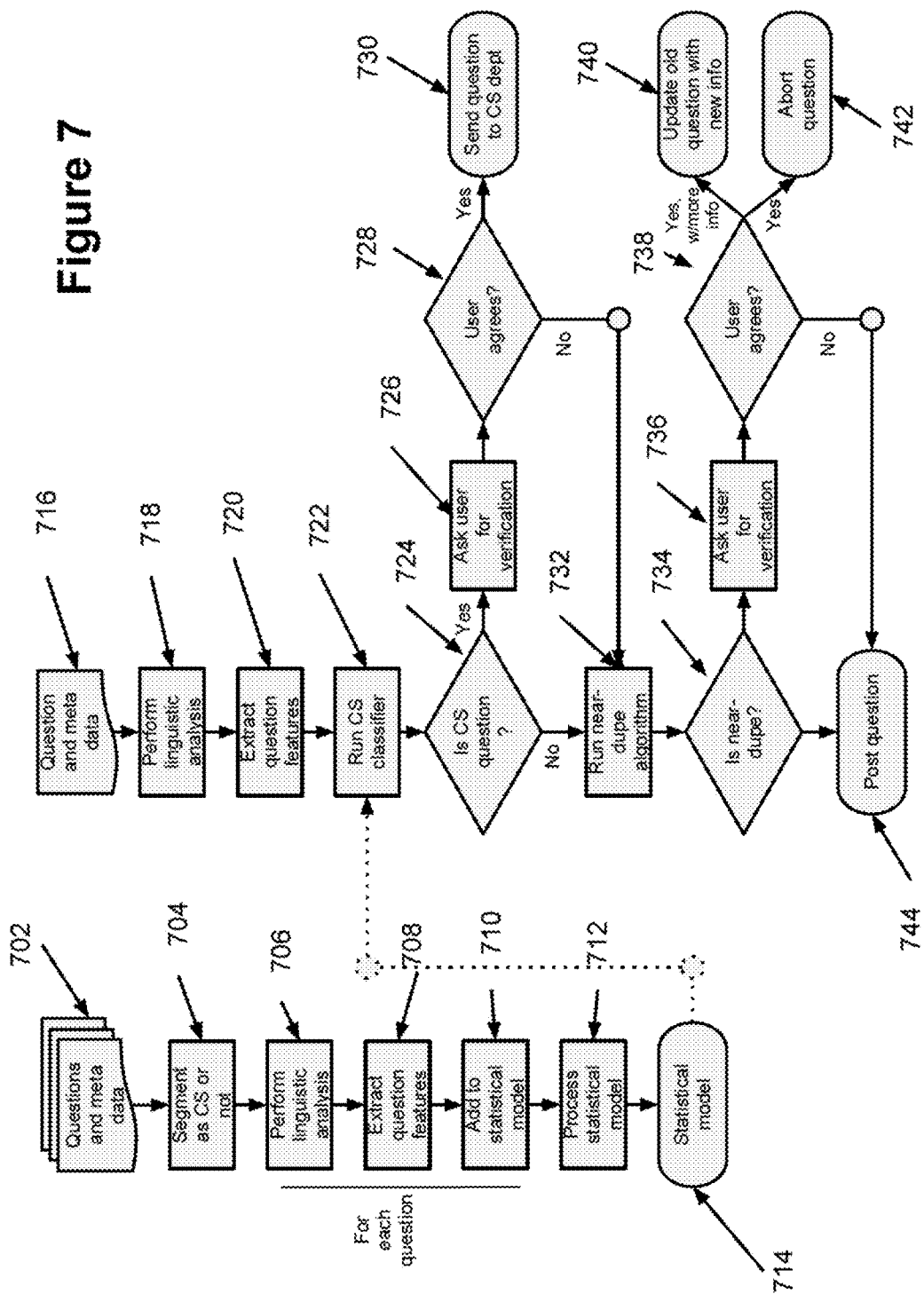
FIG. 7 shows an exemplary flowchart of a method of automatically identifying customer service questions and duplicate questions.

FIG. 7 shows an exemplary flowchart of a method of automatically identifying customer service questions. With reference to FIG. 7, in operation 702, a database of questions residing on a database server 206 is accessed and individual questions and their metadata are retrieved.

In operation 704, the questions that have already been identified as customer service questions by administrators of the online consultation system 102, category moderators, or experts are segmented in a separate group.

In operation 706, the text analysis module 514 performs linguistic analysis of each customer service question. As previously described, the text analysis may include breaking the question into its sentence components, and extracting individual tokens and phrases.

In operation 708, for each question, question features identified in the phrasal analysis and components such as tokens, stems and concepts are extracted. In addition, other question parameters such as the sentence length may be recorded for each question.

In operation 710, all the extracted question features for each question are added to a statistical model for customer service questions. The statistical model may be created using the statistical modeling engine 604. In one embodiment of the present invention, the statistical modeling may involve counting the number occurrence of each feature of the questions identified as customer service questions.

In an exemplary embodiment, in operation 712, the statistical model is processed where a probability value may be calculated and assigned to each extracted question feature being added into the model. It would be apparent to one of skill in the art that in exemplary embodiments of the present invention, after the statistical model is notified of the data points in the training set, depending on the type of model selected, further processing may be required to train the statistical model. For example, statistical models based on methods such as support vector machines and maximum entropy models require iterative calculations in order to solve a particular set of equations to a required tolerance. Other models, like a simple Naive Bayes model of the present exemplary embodiment would require no further processing after the initial identification and storage of the training data. In alternative embodiments of the present invention, the statistical model is based on a Naïve Bayesian model that may require smoothing of the question feature data or other processing of the question feature data to improve the final probabilities.

The statistical model of step 714 is used in the analysis and identification of customer service questions. In alternative embodiments, other classification means may be used to create the statistical model.

It would be apparent to one of skill in the art that the statistical model created in operation 712 may include modeling for "help questions". Help questions are different from customer service questions in that they mostly relate to how to use the online consultation system 102. Therefore, the words and concepts used in help questions as well as the average length of a help question would be different from customer service questions.

In operation 716, a new question submitted by a user along with its corresponding metadata is received. In operation 718, linguistic analysis is performed on the newly submitted question, including parsing up the question into its component tokens, concepts and phrases.

In operation 720, the question features identified in the linguistic analysis are extracted. These question features may include tokens, stems, phrases, and concepts.

In operation 722, the customer service question classifier engine 606 is used to compare the extracted question feature from the previous operation to the question features parameters of the statistical model. Based on the comparison of the features extracted from the newly submitted question to the customer service question parameters of the statistical model for customer service questions, in operation 724, a determination is made on whether the newly submitted question is a customer service question or not.

In operation 726, if the newly submitted question is identified as a probable customer service question, the user is contacted and asked to verify the nature of the newly submitted question. In operation 728, the user response to the request for confirmation is received. In operation 730, if the user confirms that the newly submitted question is a customer service question, the question is redirected to the administration division of the online consultation system 102 and the user will not be charged for submitting the question.

In alternative embodiments of the present invention, the extracted features of newly submitted confirmed customer service question are added to the database of customer service question extracted features and the corresponding statistical model is updated to reflect the new entries.

If the user denies that the newly submitted question is a customer service question, the process continues in operation 732. In operation 732, the newly submitted question is analyzed to determine whether the question is a duplicate or a near duplicate of a previously submitted question. There are many different methods of identifying a text as an exact duplicate or a near duplicate text of another document. In one exemplary embodiment of the present invention, the identification of the duplicate and near duplicate questions is performed using the methodology described in "Syntactic Clustering of the Web" (SRC Technical Note 1997-015) by Broder, Glassman, Manasse and Zweig. This technique was originally developed to find duplicate web pages and detect plagiarism. The application of the techniques described in the "Syntactic Clustering of the Web" requires certain modification in order to be applied to the process of detecting duplicate or near duplicate questions.

In operation 734, after the near duplicate detection technique is applied to the newly submitted question, the question may be tagged as either a duplicate or a near duplicate of another submitted question. In one embodiment of the present invention, the near duplicate methodology is only applied to questions submitted by a single user. In that case, when a near duplicate question is identified, the user is asked in operation 736 to verify whether he or she intended to submit a near duplicate question. In an alternative embodiment of the present invention, the near duplicate determination may be applied to any newly submitted question. In one exemplary embodiment, after it is determined that a question submitted by one user is a duplicate or near duplicate of questions previously submitted by other users, the new user may be directed to view the previously submitted duplicate or near duplicate questions and their corresponding answers, before posting his or her new question. The user may be incentivized to accept a previously submitted answer to a duplicate or near duplicate question with a lower fee. The new user may also benefit from viewing the answers to the previously submitted duplicate or near duplicate questions and being able to tailor his or her question more specifically.

In operation 738, based on the user's response, the newly submitted question may be tagged as a near duplicate question, resubmitted by the same user to supplement his or her previously submitted question with additional information. In this case, in operation 740, the previously submitted question may be updated or replaced with the new near duplicate question. In an alternative embodiment, the newly submitted question is appended to the previously submitted question. In yet another embodiment, the previously submitted question may be updated with the supplemental information provided in the newly submitted question.

If the user's response confirms that the newly submitted question was posted by mistake, in operation 742, the new question is discarded, so that the user will not be charged for a new submission.

If in operation 744, if the newly submitted question is determined not to be a duplicate or a near duplicate question, the new question is posted for viewing by the experts and receiving a response.

Figure 8:
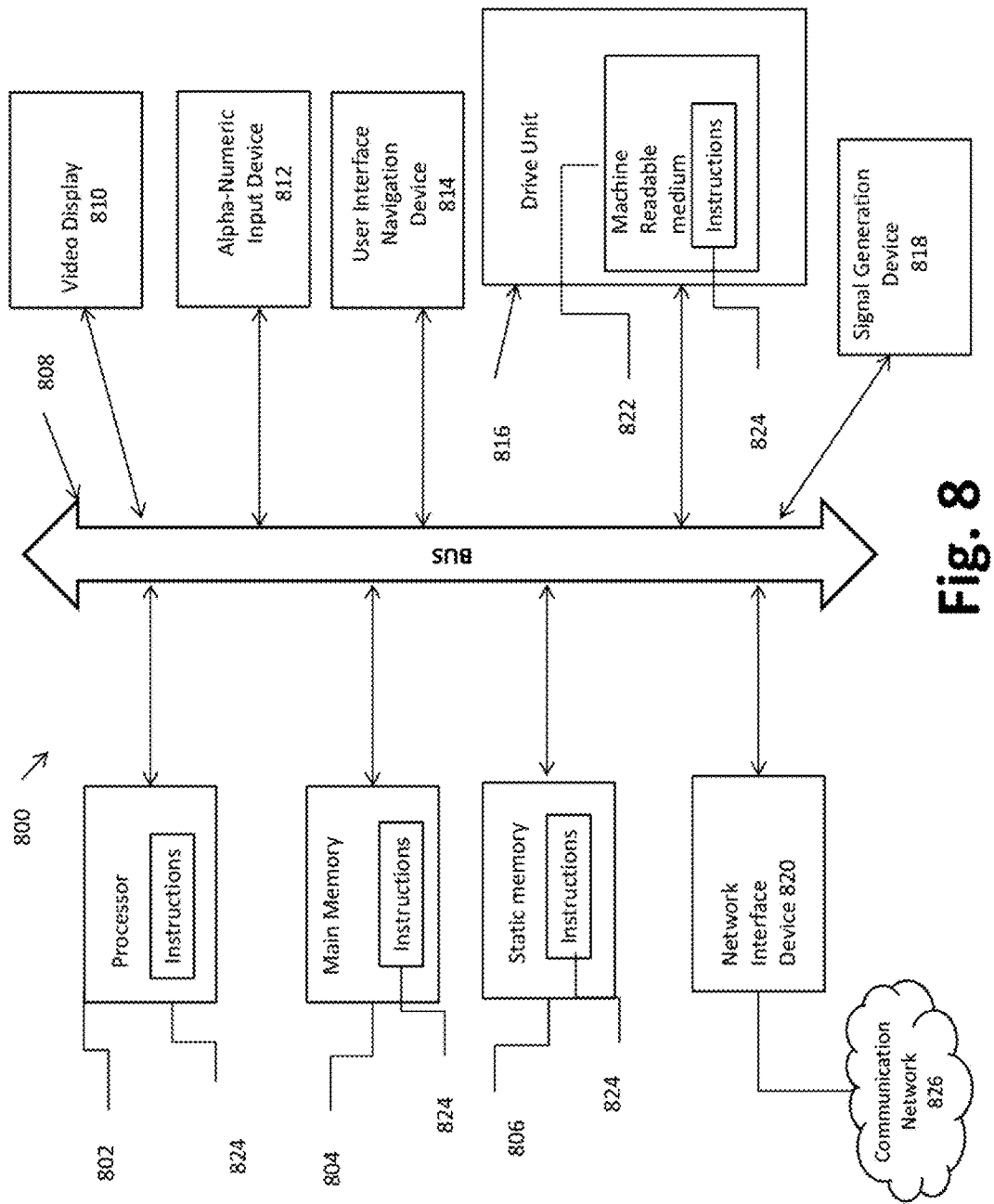
FIG. 8 shows a simplified block diagram of a digital device within which a set of instructions, for causing the machine to perform any one or more of the methodologies discussed herein, may be executed.

FIG. 8 shows a simplified block diagram of a digital device within which a set of instructions, for causing the machine to perform any one or more of the methodologies discussed herein, may be executed.

Modules, Components, and Logic

Certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain exemplary embodiments, one or more computer systems (e.g., a standalone, user, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry or in temporarily configured circuitry (e.g., configured by software) may be driven by, for example, cost, time, energy-usage, and package size considerations.

Accordingly, the term module or engine should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Exemplary Machine Architecture and Machine-Readable Medium

With reference to FIG. 8, an exemplary embodiment extends to a machine in the exemplary form of a computer system 800 within which instructions for causing the machine to perform any one or more of the methodologies discussed herein may be executed. In exemplary embodiments, the computer system 800 may be any one or more of the user 106, the expert user 108, affiliate system 110, and servers of the consultation system 102. In alternative exemplary embodiments, the machine operates as a standalone device or may be connected (e.g., networked) to other machines. In a networked deployment, the machine may operate in the capacity of a server or a user machine in server-user network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In exemplary embodiments, the computer system 800 also includes one or more of an alpha-numeric input device 812 (e.g., a keyboard), a user interface (UI) navigation device or cursor control device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, the main memory 804 and the processor 802 also constituting machine-readable media.

While the machine-readable medium 822 is shown in an exemplary embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of exemplary semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. The term "machine-readable medium" shall also be taken to include any non-transitory storage medium.

Transmission Medium

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific exemplary embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the exemplary configurations may be implemented as a combined structure or resource. Similarly, structures and functionality presented as a single resource may be implemented as separate resources.

These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method of identifying customer service and duplicate questions submitted by a user to a consultation system, the method comprising:

creating a model from features extracted from questions previously identified as customer service questions, wherein customer service questions would relate to at least one of: users accounts or profile related questions, refunds, and help questions with regards to using the online consultation system;

extracting features from a newly submitted question by performing phrasal analysis of the question;

comparing the extracted features of the newly submitted question to the extracted features of the model;

determining whether the newly submitted question is a customer service question;

wherein identifying a customer service question further comprises;

requesting confirmation from the user that the newly submitted question is a customer service question, and in response to a positive confirmation, routing the newly submitted question to a customer service department; and in response to a negative confirmation by the user, initiating a duplicate question determination process to determine if the newly submitted question is a duplicate or near duplicate of previously submitted question;

requesting verification from the user that the newly submitted question is a duplicate or near duplicate of a previously submitted question; and offering to provide to the user the answer to the previously submitted question for a reduced fee.

\* \* \* \* \*